United States Patent [19]

Behnke et al.

[11] Patent Number: 4,551,166
[45] Date of Patent: Nov. 5, 1985

[54] NITROGEN FERTILIZER AND PROCESS FOR ITS MANUFACTURE

[75] Inventors: Horst Behnke, Obing; Horst Michaud, Trostberg; Joseph Seeholzer, Trostberg; Svatoplug Solansky, Trostberg, all of Fed. Rep. of Germany

[73] Assignee: SKW Trostberg Aktiengesellschaft, Trostberg, Fed. Rep. of Germany

[21] Appl. No.: 612,264

[22] Filed: May 21, 1984

[30] Foreign Application Priority Data

May 27, 1983 [DE] Fed. Rep. of Germany ....... 3319345

[51] Int. Cl.[4] ............................ C05C 9/02; C05G 3/08
[52] U.S. Cl. ............................................. 71/30; 71/902
[58] Field of Search ................... 71/55, 56, 28, 30, 27, 71/902

[56] References Cited

U.S. PATENT DOCUMENTS

| | | | |
|---|---|---|---|
| 3,660,070 | 5/1972 | Maruta et al. | 71/30 |
| 4,234,332 | 11/1980 | Michaud et al. | 71/27 |
| 4,409,015 | 10/1983 | Grace, Jr. | 71/28 |

FOREIGN PATENT DOCUMENTS 0016362  2/1977  Japan ........................ 71/27

OTHER PUBLICATIONS

Hawley, "The Condensed Chemical Dictionary", p. 706.

*Primary Examiner*—Ferris H. Lander
*Attorney, Agent, or Firm*—Thomas L. Tully

[57] ABSTRACT

The invention relates to a nitrogen fertilizer having a long-term action based on urea-formaldehyde condensation products suspended in water. The fertilizer contains dicyandiamide in an amount of from 5 to 35% by weight of dicyandiamide-nitrogen, based on the nitrogen content of the urea, and from 0.001 to 0.5% by weight of polymers of vinyl alcohol or polymers of aldehyde-carboxylic acids, based on the weight of the suspension.

12 Claims, No Drawings

NITROGEN FERTILIZER AND PROCESS FOR ITS MANUFACTURE

BACKGROUND OF THE INVENTION

The present invention relates to a nitrogen fertilizer having a long-term action based on urea-formaldehyde condensation products suspended in water, and to a process for its manufacture.

Customary nitrogen fertilizers based on ammonium or nitrate salts and urea have the disadvantage that they are rapidly consumed in the soil and are thus available to the plants for only a short time, with the result that frequent fertilization is necessary during the vegetation period.

This short duration of action of the nitrogen fertilizers can be attributed to many causes. Since the soil cannot retain the nitrate ion, the nitrogen in nitrate form is very easily washed out into the lower layers of soil and can no longer be reached by the roots of the plants. The ammonium ion is well fixed in the soil, but nitrifying bacteria such as Nitrosomonas and Nitrobacter very quickly convert it into the nitrate form. Urea is also converted in the soil, first, by urease, into ammonium nitrogen, and then the latter is converted back into a nitrate by means of nitrification. The nitrate can, as stated above, be washed out very easily and thus under certain circumstances leads to problems in the production of drinking water.

The disadvantage that too little nitrogen is supplied to the plants cannot even be avoided by, for example, a high dose of fertilizer, because an excessive nitrate content in plants can also be detrimental to health.

In order to avoid these disadvantages an attempt has been made to manufacture nitrogen fertilizers that are more stable and have a slower action. For example, urea-formaldehyde condensation products, so-called "urea-forms", are sparingly soluble in water and are degraded slowly in damp soil by microbial decomposition and are thus available to the plants as a source of nitrogen over a longer period of time.

A disadvantage of these urea-formaldehyde condensation products is that, when they are used in the form of dispersions, they thicken or crystallize and lose their flowability and can no longer be applied by means of the customary spraying apparatus.

U.S. Pat. Nos. 4,298,512 and 4,332,610 propose the use of relatively large amounts of aldehydes, such as acetaldehyde, propionaldehyde or butyraldehyde, in order to stabilize the urea-formaldehyde dispersions. As a result of this measure, however, the nitrogen content of these fertilizers is considerably reduced and the price becomes uneconomically high, due to the relatively expensive additives.

Therefore, a principal object of the present invention was to develop a nitrogen fertilizer having a long-term action based on urea-formaldehyde condensation products suspended in water, which does not have the mentioned disadvantages, has adequate stability and a high nitrogen content, and does not require expensive additives.

SUMMARY OF THE INVENTION

The present invention relates to aqueous suspensions of urea-formaldehyde condensation products containing dicyandiamide in an amount of from 5% to 35% by weight of dicyandiamide-nitrogen, based on the nitrogen content of the urea, and from 0.001% to 0.5% by weight of a polymer selected from the group consisting of polymers of vinyl alcohol and polymers of aldehyde-carboxylic acids, based on the weight of the suspension.

It has been found, surprisingly, that the fertilizer suspensions according to the invention are adequately stable, that is to say, they do not tend to thicken or to crystallize. The dicyandiamide functions as a liquifier, with the result that milky dispersions of very low viscosity are formed which can be applied without difficulty. Since dicyandiamide itself is a very nitrogen-rich compound (nitrogen content 66.6%) and thus increases the N content of the fertilizer, the fertilizer according to the invention does not contain any appreciable amounts of foreign substances which can be degraded in the soil only with difficulty, or not at all. The dicyandiamide-nitrogen content should be from 5% to 35% by weight, preferably from 10% to 30% by weight, based on the nitrogen content of the urea, in order to achieve the desired effect. It is, in principle, also possible to use larger amounts of dicyandiamide, but such additives raise the cost to the point that the composition is not economically-feasible.

In order to achieve long-term stability of the urea-formaldehyde dispersion, it is necessary to add stabilizers to the dispersion. Polymers of vinyl alcohol or polymeric aldehyde-carboxylic acids have been found to be especially effective. Polyvinyl alcohols of the partially hydrolysed types, that is to say, the polymers having a degree of hydrolysis of from 70% to 90%, are most effective. Such polyvinyl alcohols are commercially available under the trademarks of Polyviol and Mowiol. Polymeric aldehyde-carboxylic acids may also be used, instead of these polyvinyl alcohols. These low-viscosity polymers are added subsequently in the form of aqueous solutions to the urea-formaldehyde polymer in an amount of from 0.001% to 0.5% by weight, preferably from 0.01% to 0.25% by weight.

Urea-formaldehyde dispersions which remain liquid for six months or longer are obtained with these additives. Should some settling occur in the dispersion, the dispersion can be uniformly distributed again by simply agitating or stirring. The settling may optionally be avoided by the addition of thickening agents that increase viscosity, such as, for example, cellulose ethers.

The fertilizers according to the invention are manufactured under the conditions customary for the urea-formaldehyde condensation reaction, that is to say, the urea is reacted with formaldehyde in aqueous solution in a molar ratio of from 1.5:1 to 2.5:1, the reaction first being carried out at elevated temperature in a neutral to weakly alkaline pH range.

After the addition of sulphuric acid, insoluble methylene urea polymers are formed, resulting in the formation of a milky dispersion. These urea-formaldehyde condensation products also contain nitrogen components that are soluble in water, such as urea, methylene bisurea and methylene ureas having up to approximately four methylene groups. Methylene ureas having more than five methylene groupings are insoluble in water. The amount of water-insoluble nitrogen compounds can be controlled within wide limits by means of the reaction conditions. Thus, for example, using relatively high temperatures and relatively large amounts of sulphuric acid, the water-insoluble content can be increased.

The addition of the dicyandiamide can be carried out at several points in the condensation reaction. It can either be added right at the beginning of the reaction, together with the urea and the formalin, or later during the reaction, for example, after the addition of the sulphuric acid, or at the end of the reaction, before or after cooling. In all cases it was found, surprisingly, that under the conditions of the urea-formaldehyde condensation reaction the methylene bisurea analogue, methylene bisdicyandiamide, is not formed and the dicyandiamide is not incorporated into the urea-methylene polymer compound. In addition, the dicyandiamide is not converted into guanylurea; it is present in monomeric form and thus retains its full effectiveness as a nitrification inhibitor.

The dicyandiamide is added in such an amount that sufficient nitrification inhibition is available for the soluble nitrogen compounds. An optimum amount of dicyandiamide has been added when there are from 5% to 35% by weight, preferably from 10% to 30% by weight, of dicyandiamide-nitrogen per portion of nitrogen in the urea.

The addition of dicyandiamide enables the soluble nitrogen components of the fertilizer to be increased as the initial, rapidly-formed ammonium nitrogen is stabilized by the dicyandiamide. The other advantages of the fertilizer suspension according to the invention are a higher nitrogen content, good long-term action, high stability and homogeneity, as a result of which the aqueous fertilizer composition can be applied with the aid of the customary technical equipment. The nitrogen fertilizer described is outstandingly suitable for lawns, gardens and agriculture.

The following Examples are intended to explain the invention in detail, without, however, limiting it thereto.

EXAMPLE 1

322 g of water, 350 g of 30% formalin, 1.75 ml of 4% NaOH, 378 g of urea and 36.2 g of dicyandiamide are introduced in order into a heatable and coolable stirred vessel having a reflux condenser, and the whole is heated slowly to 80° C. while stirring. After the first exothermic reaction is completed, 2.8 ml of 20% sulphuric acid are added. As a result of the second exothermic reaction, the temperature rises to from 95° to 98° C. When the temperature stops rising, the whole is cooled rapidly so that the temperature drops to 60° within from 6 to 8 minutes. Cooling is continued and, after 30° C. has been reached, the whole is neutralized with 2 ml of 10% NaOH. The milky, thinly-liquid dispersion, which has an outflow time of 12 seconds in a Ford viscosimeter (4 mm nozzle), is then mixed immediately with 13.7 g of a 20% aqueous polyvinyl alcohol solution (Mowiol 3-83, degree of hydrolysis 83%, from Hoechst) (0.25% solid polymer in the dispersion). After a storage time of 3 months, the dispersion, which has settled somewhat, can easily be homogenized again by means of shaking or stirring.

The molar ratio of urea : formaldehyde : dicyandiamide in this dispersion is 1.8 : 1 : 0.123, and the total N content is 17.2%. The content of dicyandiamide-N is 13.7%, based on urea-N.

EXAMPLE 2

The process of Example 1 is repeated except that dicyandiamide is added at the end of the condensation reaction, after the neutralization with NaOH. The finished dispersion is likewise mixed subsequently with 5.47 g of a 20% polyvinyl alcohol solution (0.1% solid polyvinyl alcohol in the dispersion). The polyvinyl alcohol used has a degree of hydrolysis of 79% (Mowiol LP 15-79 from Hoechst). Even after a storage time of over 3 months, no crystallization or solidification can be detected.

EXAMPLE 3

The process of Example 1 is repeated except that dicyandiamide is added during the condensation reaction, after the addition of the sulphuric acid. In this case, 5.47 g of a 20% polyaldehyde-carboxylic acid (POC HS 2020 from Degussa) is subsequently admixed with the finished dispersion (0.1% solid polyaldehyde-carboxylic acid in the dispersion). The dispersion is still free of crystalline content and is capable of flowing freely after a storage time of 3 months.

EXAMPLE 4

579 g of water, 630 g of 30% formalin, 3 ml of 4% NaOH, 680.4 g of urea and 130.4 g of dicyandiamide are introduced in order into a heatable and coolable stirred vessel having a reflux condenser, and the whole is heated slowly to 80° C. After the addition of 3.5 ml of 20% sulphuric acid, the temperature rises to approximately 95° C. When the exothermic reaction is completed, the whole is cooled rapidly to 30° C. and neutralized with 4.75 ml of 10% NaOH. The whole is then mixed with 5.08 g of a 20% polyvinyl alcohol solution (0.05% polyvinyl alcohol solids in the dispersion). The polyvinyl alcohol has a degree of hydrolysis of 74% (Mowiol LP 10-74, from Hoechst AG). The milky dispersion does not contain any crystalline components and is still capable of flowing after a storage time of 3 months. The molar ratio of urea : formaldehyde : dicyandiamide in this dispersion is 1.8 : 1 : 0.246, and the total N content is 19.9%. The dicyandiamide-N content is 27.4%, based on urea-N.

Variations and modifications of the present invention will be apparent to those skilled in the art within the scope of the present claims.

We claim:

1. Stable aqueous nitrogen fertilizer composition having a long-term action comprising a suspension of a condensate of a molar excess of urea per mol of formaldehyde, a sufficient amount of dicyandiamide to provide from about 5% to 35% by weight of dicyandiamide-nitrogen, based upon the nitrogen content of the urea, and from 0.001% to 0.5% by weight of a stabilizer comprising a water-soluble polymer selected from the group consisting of polymers of vinyl alcohol and polymers of aldehyde-carboxylic acids, based upon the weight of the suspension, said dicyandiamide being present in said composition in monomeric form and functioning as a nitrification inhibitor.

2. Nitrogen fertilizer composition according to claim 1 characterized in that said condensate comprises urea and formaldehyde in a molar ratio of from 1.5:1 to 2.5:1.

3. Nitrogen fertilizer composition according to claim 1 characterized in that it contains dicyandiamide in an amount of from 10% to 30% by weight of dicyandiamide-nitrogen, based on the nitrogen content of the urea.

4. Nitrogen fertilizer composition according to claim 3, characterized in that it contains from 0.01% to 0.25% by weight of said polymer, based on the weight of the suspension.

5. Nitrogen fertilizer composition according to claim 3, characterized in that the polymer of vinyl alcohol has a degree of hydrolysis of from 70% to 90%.

6. Nitrogen fertilizer composition according to claim 1, characterized in that it contains from 0.01% to 0.25% by weight of said polymer, based on the weight of the suspension.

7. Nitrogen fertilizer composition according to claim 6, characterized in that the polymer of vinyl alcohol has a degree of hydrolysis of from 70% to 90%.

8. Nitrogen fertilizer composition according to claim 1, characterized in that the polymer of vinyl alcohol has a degree of hydrolysis of from 70% to 90%.

9. Process for the manufacture of a stable, aqueous nitrogen fertilizer composition having a long-term action comprising the steps of reacting urea and formaldehyde in a molar ratio of from 1.5:1 to 2.5:1 in a neutral or weakly alkaline aqueous reaction medium, condensing the reaction product with acid and neutralizing the reaction medium to form a urea-formaldehyde condensation product suspended in the aqueous reaction medium, adding dicyandiamide in a weight equal to from 5% to 35% by weight of dicyandiamide-nitrogen, based upon the nitrogen content of the urea, either before, during or after the urea-formaldehyde reaction to provide a monomeric nitrification inhibitor in said composition, and finally adding from 0.001% to 0.5% by weight of a stabilizer comprising a water-soluble polymer selected from the group consisting of polymers of vinyl alcohol and polymers of aldehyde-carboxylic acids, based upon the total weight of the suspension.

10. Process according to claim 8 which comprises adding said dicyandiamide-nitrogen in an amount of from 10% to 30% based upon the nitrogen content of the urea.

11. Process according to claim 9 which comprises adding said polymer in a weight of from 0.01% to 0.25% based upon the total weight of the suspension.

12. Process according to claim 9 in which said polymer comprises polyvinyl alcohol having a degree of hydrolysis of from 70 to 90%.

* * * * *